United States Patent
Ojima et al.

(10) Patent No.: US 11,904,961 B2
(45) Date of Patent: Feb. 20, 2024

(54) STEERING DEVICE FOR AUTOMATIC DRIVING VEHICLE AND AUTOMATIC DRIVING VEHICLE PROVIDED WITH SAME

(71) Applicant: HONDA MOTOR CO., LTD., Tokyo (JP)

(72) Inventors: Yosuke Ojima, Tokyo (JP); Munetsugu Hanji, Tokyo (JP); Hayato Miyakawa, Tokyo (JP); Kunimichi Hatano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 17/679,536

(22) Filed: Feb. 24, 2022

(65) Prior Publication Data

US 2022/0306187 A1  Sep. 29, 2022

(30) Foreign Application Priority Data

Mar. 26, 2021 (JP) ................................. 2021-053024

(51) Int. Cl.
  *B62D 6/00* (2006.01)
  *B62D 5/00* (2006.01)
  *B60W 60/00* (2020.01)
(52) U.S. Cl.
  CPC ............ *B62D 6/002* (2013.01); *B60W 60/005* (2020.02); *B62D 5/008* (2013.01); *B60W 2710/20* (2013.01)

(58) Field of Classification Search
  CPC .......... B62D 6/002; B62D 5/008; B62D 6/00; B60W 60/005; B60W 2710/20; B60W 60/0051; B60W 60/0053
  See application file for complete search history.

(56) References Cited

U.S. PATENT DOCUMENTS

2019/0025823 A1\* 1/2019 Christiansen .......... G05D 1/021
2019/0171204 A1\* 6/2019 Jang ...................... B60W 30/14

FOREIGN PATENT DOCUMENTS

JP   6187090 B2   8/2017

\* cited by examiner

*Primary Examiner* — Jacob M Amick
(74) *Attorney, Agent, or Firm* — Armstrong Teasdale LLP

(57) ABSTRACT

A steering device includes: a steering wheel which is rotatable over an angle range exceeding 180 degrees in each of leftward and rightward directions from a neutral position; a steering mechanism that steers a wheel according to a steering angle of the steering wheel, with a ratio of the steering angle to a steered angle being changeable; and a control device that controls the ratio of the steering mechanism. The control device sets the ratio to a first value during travel of a vehicle in the manual driving mode and sets the ratio to a second value smaller than the first value during travel of the vehicle in the automatic driving mode, wherein the second value is set such that the steering angle corresponding to a maximum steered angle of the wheel specified by the steering mechanism is less than 180 degrees.

7 Claims, 7 Drawing Sheets

STEERING DEVICE FOR AUTOMATIC DRIVING VEHICLE AND AUTOMATIC DRIVING VEHICLE PROVIDED WITH SAME

TECHNICAL FIELD

The present invention relates to a steering device for an automatic driving vehicle which can travel in an automatic driving mode and an automatic driving vehicle provided with the steering device.

BACKGROUND ART

In a vehicle driving control device which can switch between an automatic driving mode in which automatic travel control is performed to make the own vehicle travel automatically and a manual driving mode in which the automatic travel control is stopped and the driver can drive the vehicle manually, it is known to switch the driving mode from the automatic driving mode to the manual driving mode when an amount of steering of the steering wheel performed by the driver exceeds a preset determination threshold value (see JP6187090B2).

However, during automatic driving such as when performing parking assist or low-speed driving assist in an urban area, the steering wheel may be rotated (turned) 360 degrees or more. In such a case, if the driving mode is simply switched from the automatic driving mode to the manual driving mode as in the vehicle driving control device of JP6187090B2 when the driver operates the steering wheel in emergency for example, the driver may misunderstand the state of the vehicle. Namely, a situation may occur where the driver thinks that the vehicle is moving approximately straight (the steering angle is near 0 degrees) when the driver grips the steering wheel though actually the vehicle is in a steered state (the steering angle is near 360 degrees). In such a situation, since there is a discrepancy between the traveling direction of the vehicle recognized by the driver and the actual traveling direction of the vehicle, the driver may not be able to properly perform driving operation and/or may have a sense of incongruity.

SUMMARY OF THE INVENTION

In view of such background, a primary object of the present invention is to prevent the steering angle recognized by the driver from differing from the actual steering angle when the driving mode is switched from the automatic driving mode to the manual driving mode.

To achieve the above object, one embodiment of the present invention provides a steering device (10) for an automatic driving vehicle (1) which can switch a driving mode between a manual driving mode and an automatic driving mode, the steering device comprising: a steering wheel (6) which is configured to be rotatable over an angle range exceeding 180 degrees in each of leftward and rightward directions from a neutral position; a steering mechanism (11) that steers a wheel (3) according to a steering angle ($\beta$) of the steering wheel, with a ratio (K=$\beta/\alpha$) of the steering angle to a steered angle ($\alpha$) being changeable; and a control device (15) that controls the ratio of the steering mechanism, wherein the control device sets the ratio to a first value (for example, 9) during travel in the manual driving mode and sets the ratio to a second value (for example, 3) smaller than the first value during travel in the automatic driving mode, wherein the second value is set such that the steering angle corresponding to a maximum steered angle of the wheel specified by the steering mechanism is less than 180 degrees.

According to this configuration, the steering wheel is prevented from being rotated 180 degrees or more during travel in the automatic driving mode, whereby it is possible to prevent the steering angle recognized by the driver from differing from the actual steering angle.

Preferably, in a case where the steered angle ($\alpha$) is not 0 when the driving mode is switched from the automatic driving mode to the manual driving mode, the control device changes the steered angle ($\alpha$) to gradually increase the ratio from the second value to the first value while the steering angle ($\beta$) is not changing.

After the driving mode is switched, the control device needs to change the ratio. According to the above configuration, the control device can change the ratio from the second value to the first value by gradually increasing the ratio as a result of changing the steered angle while the steering angle is not changing. Also, when the driving mode is switched to the manual driving mode, it is likely that the driver is gripping the steering wheel, but since the control device changes the steered angle, the ratio can be changed even though the driver is gripping the steering wheel.

Preferably, in a case where the steered angle ($\alpha$) is not 0 when the driving mode is switched from the automatic driving mode to the manual driving mode, the control device changes the steered angle ($\alpha$) to gradually increase the ratio from the second value to the first value while the steering angle ($\beta$) is changing.

After the driving mode is switched, the control device needs to change the ratio. According to the above configuration, the control device can change the ratio from the second value to the first value by gradually increasing the ratio as a result of changing the steered angle while the steering angle is changing. Also, in a case where the driver is steering the steering wheel after the driving mode is switched to the manual driving mode, the control device gradually increases the ratio while steering the wheel in the steering direction, whereby it is possible to change the ratio from the second value to the first value while making the vehicle turn in the steering direction.

Preferably, in a case where the steered angle ($\alpha$) is not 0 when the driving mode is switched from the manual driving mode to the automatic driving mode, the control device changes the steering angle ($\beta$) to gradually decrease the ratio from the first value to the second value.

After the driving mode is switched, the control device needs to change the ratio. According to the above configuration, the control device can change the ratio from the first value to the second value by gradually decreasing the ratio as a result of changing the steering angle. Also, when the driving mode is switched to the automatic driving mode, it is likely that the driver is not gripping the steering wheel, and therefore, it is possible to change the ratio by changing the steering angle without changing the travel trajectory.

Also, to achieve the above object, one embodiment of the present invention provides an automatic driving vehicle (1) provided with the aforementioned steering device (4), the automatic driving vehicle further comprising an automatic steering control device (4) that executes automatic steering control to control steering by setting an instruction value ($\alpha$t) of at least the steered angle in the automatic driving mode, wherein when the driving mode is switched from the manual driving mode to the automatic driving mode, the automatic steering control device starts the automatic steering control from the steered angle immediately before switching of the driving mode.

According to this configuration, even when the ratio is changed, the steered angle does not change abruptly and abrupt change of the travel trajectory can be prevented.

Preferably, when the driving mode is switched from the automatic driving mode to the manual driving mode, the control device (15) obtains an amount of change of the steering angle from a target steering angle ($\beta t$) which corresponds to the instruction value ($\alpha t$) of the steered angle immediately before switching of the driving mode, obtains a steered angle correction value ($\alpha c$) by dividing the amount of change of the steering angle by the first value, and obtains a steered angle control amount by adding the steered angle correction value to the instruction value.

When the driving mode is switched from the automatic driving mode to the manual driving mode, if the control device changes the steered angle to correspond to the absolute value of the steering angle, the steering direction of the wheel may become opposite to the driver's steering direction. According to the above configuration, it is possible to make the steering direction of the wheel match the driver's steering direction by steering the wheel based on the steered angle control amount obtained as mentioned above.

Preferably, the automatic driving vehicle further comprises a display (36) that indicates the driving mode that is selected.

According to this configuration, the driver can easily understand whether the vehicle is in the automatic driving or in the manual driving, whereby the driver can recognize the difference of the ratio.

According to the foregoing configuration, it is possible to prevent the steering angle recognized by the driver from differing from the actual steering angle when the driving mode is switched from the automatic driving mode to the manual driving mode.

DETAILED DESCRIPTION OF THE INVENTION

Figure 1:
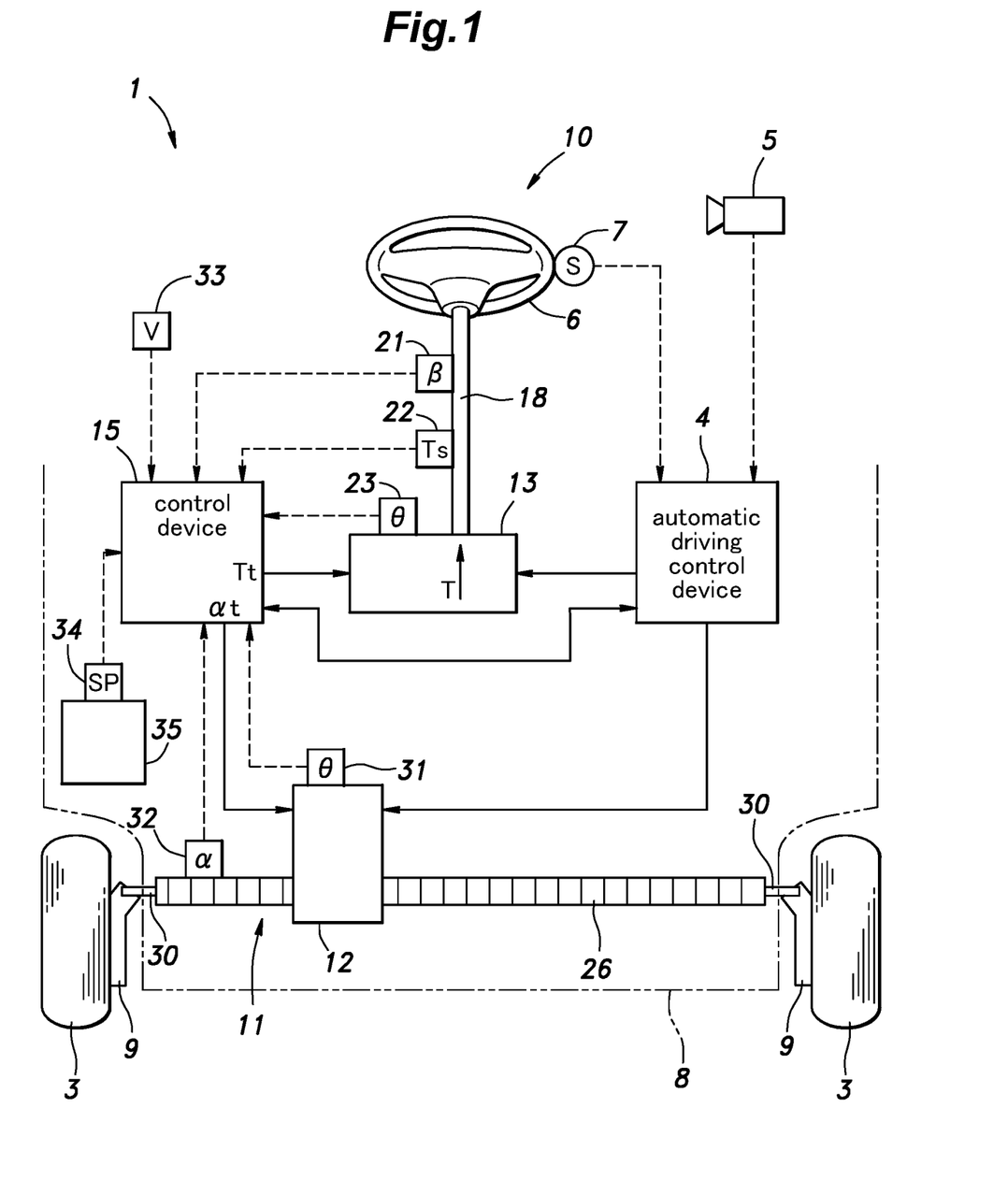
FIG. 1 is a configuration diagram of a steering device according to an embodiment of the present invention.

In the following, a steering device 10 for a vehicle 1 according to an embodiment of the present invention will be described. First, description will be made of the vehicle 1 and an automatic driving function that the vehicle 1 is provided with. As shown in FIG. 1, the vehicle 1 provided with the steering device 10 is a four-wheeled automobile having left and right front wheels 3 and left and right rear wheels (not shown in the drawings). The vehicle 1 is an automatic driving vehicle provided with an automatic driving control device 4 that executes automatic driving control (hereinafter, automatic driving) at level "2" or higher by combining various kinds of vehicle control. The automatic driving control device 4 may be a known type which includes a CPU which executes operation processing according to a program so that the automatic driving control device 4 executes various types of vehicle control to perform automatic driving.

The automatic driving control device 4 receives instruction to start or end the execution of the automatic driving from a vehicle occupant via a driving mode selector switch, and accordingly switches the driving mode between an automatic driving mode and a manual driving mode. The driving mode selector switch may be a mechanical switch disposed at an appropriate position in the cabin or a graphical user interface (GUI) switch displayed on a touch panel, and may be configured by a navigation interface.

In the automatic driving mode, the automatic driving control device 4 performs all driving operations including acceleration, deceleration, and steering of the vehicle 1, operation of indicator lights, monitoring of the surroundings and occupants, etc. In the manual driving mode, the automatic driving control device 4 does not control the vehicle 1, and all driving operations are performed by the driver. In the automatic driving mode, the automatic driving control device 4 sets at least an instruction value of the steered angle $\alpha$ and executes automatic steering control to control steering.

The vehicle 1 is provided with an occupant monitoring device which includes an interior camera 5 serving as an imaging device that captures an image of the driver seated in the driving seat and a gripping sensor 7 that detects a gripping state of the steering wheel 6. The interior camera 5 is, for example, a digital camera that uses a solid imaging element such as a CCD or a CMOS. The gripping sensor 7 is a sensor that detects whether the driver is gripping the steering wheel 6 and outputs a detection signal indicating whether the steering wheel 6 is gripped or not. The gripping sensor 7 is preferably formed of an electrostatic capacitance sensor or a piezoelectric element provided on the steering wheel 6, for example.

The automatic driving control device 4 determines whether the driver is in an abnormal state based on the image captured by the interior camera 5 (result of image capture). For example, the automatic driving control device 4 extracts a face region of the driver from the captured image by using a known image analysis method. Further, the automatic driving control device 4 determines whether the driver is duly paying attention to the vehicle surroundings based on various information extracted from the extracted face region. Also, during automatic driving at level "1," the automatic driving control device 4 detects whether the driver is gripping the steering wheel 6 based on the signal from the gripping sensor 7, and if not, determines that the driver is not duly paying attention to the vehicle surroundings.

Next, the steering device 10 will be described. The steering device 10 is a vehicle steering device of a steer-by-wire (SBW) type. The left and right front wheels 3 are supported on a vehicle body 8 (in FIG. 1, only an outline of a lower portion thereof is shown) via respective knuckles 9 such that a steered angle $\alpha$ can be changed, and function as steered wheels. The steered angle $\alpha$ refers to an angle of the front wheels 3 relative to the fore and aft direction in plan view. The steering device 10 changes the steered angle $\alpha$ of the front wheels 3.

The steering device 10 includes a steering wheel 6 rotatably provided in the vehicle body 8, a steering mechanism 11 that steers the front wheels 3, a steering actuator 12 that gives a driving force to the steering mechanism 11, and a reaction force actuator 13 that gives a reaction force torque T to the steering wheel 6. In addition, the steering device 10 includes a control device 15 that controls the reaction force actuator 13 and the steering actuator 12. The steering device 10 may be constituted as a redundant system including multiple steering actuators 12, multiple reaction force actuators 13, and multiple control devices 15.

The steering wheel 6 receives a steering operation performed by the driver. The steering wheel 6 is attached to the rear end of a steering shaft 18 rotatably supported by the vehicle body 8 and rotates integrally with the steering shaft 18. The steering shaft 18 is rotatably supported by a steering column (not shown in the drawings) provided in the vehicle body 8 and the rear end of the steering shaft 18 protrudes rearward from the steering column.

The steering wheel 6 is configured to be rotatable over an angle range exceeding 180 degrees in each of leftward and rightward directions from the neutral position. The steering wheel 6 of the present embodiment is rotatable about 540 degrees to the left and right from the neutral position. The rotation angle range of the steering wheel 6 may be defined by a physical stopper or may be defined by a control stopper.

The reaction force actuator 13 is an electric motor and is coupled with the steering shaft 18 via gears. When the reaction force actuator 13 is driven, the driving force is transmitted to the steering shaft 18 as a rotational force. Thus, the reaction force actuator 13 when rotated applies a torque to the steering wheel 6. The torque applied to the steering wheel 6 from the reaction force actuator 13 according to the steering operation is referred to as a reaction force torque T.

The steering device 10 includes a steering angle sensor 21 that detects a rotation angle of the steering shaft 18 about an axis as a steering angle $\beta$. The steering angle sensor 21 may be a known rotary encoder. Also, the steering device 10 includes a torque sensor 22 that detects a torque applied to the steering shaft 18 as a steering torque Ts. The torque sensor 22 detects the steering torque Ts applied to a part of the steering shaft 18 between the steering wheel 6 and the reaction force actuator 13. The steering torque Ts is determined by an operation torque applied to the steering wheel 6 by the driver and the reaction force torque T applied to the steering shaft 18 by the reaction force actuator 13. The torque sensor 22 may be a known torque sensor such as a magnetostriction type torque sensor or a strain gauge, or may be a sensor that uses an estimated value based on the value of an electric current flowing through the electric motor of the reaction force actuator 13.

The steering device 10 includes a first rotation angle sensor 23 that detects a rotation angle $\theta$ of the reaction force actuator 13. The first rotation angle sensor 23 may be a known resolver or rotary encoder.

The steering mechanism 11 includes a rack shaft 26 extending in the vehicle width direction. The rack shaft 26 is supported in a gear housing (not shown in the drawings) to be movable in the vehicle width direction. The left and right end portions of the rack shaft 26 are connected to the respective knuckles 9, which support the left and right front wheels 3, via respective tie rods 30. Movement of the rack shaft 26 in the vehicle width direction changes the steered angle $\alpha$ of the front wheels 3. The steering mechanism 11 is mechanically separated from the steering wheel 6.

The steering actuator 12 is an electric motor. The steering actuator 12 causes the rack shaft 26 to move in the vehicle width direction based on the signal from the control device 15, thereby to change the steered angle $\alpha$ of the left and right front wheels 3. Thus, the steering actuator 12 can change a ratio K of the steering angle $\beta$ to the steered angle $\alpha$ (K is an angle ratio and, in the present embodiment, corresponds to a virtual gear ratio) by changing the steered angle $\alpha$ of the front wheels 3 when the steering angle $\beta$ is not changing. The ratio K is obtained by dividing the steering angle $\beta$ by the steered angle $\alpha$ ($K=\beta/\alpha$).

The steering device 10 includes a second rotation angle sensor 31 that detects the rotation angle $\theta$ of the steering actuator 12. The second rotation angle sensor 31 may be a known resolver or rotary encoder. Also, the steering device 10 includes a steered angle sensor 32 that detects the steered angle $\alpha$ of the front wheels 3. In the present embodiment, the steered angle sensor 32 includes a rack stroke sensor that detects a rack position, which is a position of the rack shaft 26 in the vehicle width direction, and detects the steered angle $\alpha$ of the front wheels 3 based on the rack position.

The control device 15 is an electronic control unit including a CPU, a memory, a storage device storing programs, and the like. The control device 15 is connected with the steering angle sensor 21, the torque sensor 22, the first rotation angle sensor 23, the second rotation angle sensor 31, and the steered angle sensor 32. Based on the signals from these sensors, the control device 15 acquires signals corresponding to the steering angle $\beta$, the steering torque Ts, the rotation angle $\theta$ of the reaction force actuator 13, the rotation angle $\theta$ of the steering actuator 12, and the steered angle $\alpha$. Also, the control device 15 is connected with a vehicle speed sensor 33 and a shift position sensor 34 and acquires therefrom a vehicle speed V and a shift position SP of a transmission 35.

The transmission 35 is a device that changes a power transmission mode from a travel drive source installed in the vehicle 1 to the wheels. For example, in a case where the vehicle 1 has an internal combustion engine installed as the travel drive source, the transmission 35 typically includes a gear/belt transmission that changes the driving force transmission mode from the internal combustion engine to the driving wheels. Also, in a case where the vehicle 1 has an electric motor installed as the travel drive source, the transmission 35 typically includes a power unit that changes the driving force transmission mode from the electric motor to the driving wheels.

In a case where the transmission 35 is an automatic transmission, the transmission 35 is typically provided with a parking position "P," a neutral position "N," a drive position "D," and a reverse position "R" which can be selected as the shift position SP indicating the driving force transmission mode. In addition, one or more numbered positions for forward motion (such as positions corresponding to the 1st gear (low) and the 2nd gear) may be provided. In a case where the transmission 35 is a manual transmission, the transmission 35 is typically provided with a neutral position "N," multiple numbered forward positions (corresponding to 1st to 5th gears, for example), and a reverse position "R."

The shift position SP of the transmission 35 is switched by a switching operation performed by the driver on a switching member such as a gear lever or a shift button. Note that the shift button may be a function button displayed on a touch panel display. The shift position sensor 34 acquires a signal corresponding to the shift position SP of the transmission 35 that is selected by the driver. The vehicle system including the control device 15 is configured such that ON/OFF thereof can be switched only when the transmission 35 is in the parking position "P" or the neutral position "N."

The control device 15 is connected with the reaction force actuator 13 and the steering actuator 12 and controls the reaction force actuator 13 and the steering actuator 12. The control device 15 controls the steering actuator 12 according to the steering angle β and controls the reaction force actuator 13 according to the steered angle α.

In the following, control performed by the control device 15 will be described concretely. First, the control during the manual driving (when the automatic driving control device 4 selects the manual driving mode) will be described. Based on the steering angle β detected by the steering angle sensor 21, the control device 15 calculates a target steered angle at that has a predetermined relationship with the steering angle β. Preferably, the control device 15 calculates the target steered angle at by dividing the steering angle β by a ratio K preset according to the shift position SP and the vehicle speed V, for example (αt=β/K). The ratio K is set such that the steered angle α of the front wheels 3 becomes the maximum (for example, 60 degrees) when the steering wheel 6 is steered about one turn and a half (about 540 degrees) to the left and right during low speed travel or during travel with the reverse position "R" (during backward movement). At this time, the ratio K is set to a first value. The first value may be 6 to 18, for example, and in the present embodiment, about 9.

Then, the control device 15 calculates a first current value A1 to be supplied to the steering actuator 12 based on a deviation Δα (=αt−α) between the target steered angle at and the steered angle α to make the steered angle α approach the target steered angle at. Namely, the control device 15 performs feedback control of the steering actuator 12 based on the deviation Δα. The larger the deviation Δα is, the greater the first current value A1 supplied to the steering actuator 12 becomes, the greater the output of the steering actuator 12 becomes, and the greater the changing speed of the steered angle α becomes.

For example, in a case where the driver accelerates the vehicle 1 by operating the accelerator while keeping the steering angle β of the steering wheel 6 constant, the control device 15 makes the ratio K smaller so that the wheels are steered with a smaller steered angle α as the vehicle speed V increases.

The control device 15 calculates a target reaction force torque Tt to be generated by the reaction force actuator 13 based on the steering state of the front wheels 3; more specifically, based on the deviation Δα. Preferably, the target reaction force torque Tt is calculated by multiplying Δα by a predetermined coefficient. Then, based on the calculated target reaction force torque Tt, the control device 15 calculates a second current value A2 to be supplied to the reaction force actuator 13. Preferably, the second current value A2 to be supplied to the reaction force actuator 13 is decided by referring to a predetermined map based on the target reaction force torque Tt. Note that in another embodiment, the control device 15 may decide the second current value A2 by referring to a predetermined map based on the deviation Δα. The target reaction force torque Tt and the second current value A2 are set to be larger as the deviation Δα regarding the steered angle α becomes larger.

The control device 15 supplies the second current value A2 to the reaction force actuator 13 to make the reaction force actuator 13 generate a driving force. The driving force generated by the reaction force actuator 13 is applied to the steering shaft 18 as the reaction force torque T acting against the driver's operation input. Thereby, the driver can receive a reaction force (resistive force) against the steering operation via the steering wheel 6.

Next, the control performed by the control device 15 during the automatic driving (when the automatic driving control device 4 selects the automatic driving mode) will be described. The control device 15 controls the steering actuator 12 based on the target steered angle αt set by the automatic driving control device 4 and the steered angle α detected by the steered angle sensor 32. Specifically, the control device 15 calculates a first current value A1 to be supplied to the steering actuator 12 based on a deviation Δα (=αt−α) between the target steered angle αt and the steered angle α to make the steered angle α approach the target steered angle αt.

Also, based on the target steered angle αt set by the automatic driving control device 4, the control device 15 calculates a target steering angle βt that has a predetermined relationship with the target steered angle αt. Preferably, the control device 15 calculates the target steering angle βt by multiplying the target steered angle αt by a predetermined ratio K (βt=α×K). At this time, the ratio K is set such that the target steering angle βt of the steering wheel 6 becomes less than 180 degrees when the steered angle α of the front wheels 3 becomes the maximum (for example, 60 degrees) during low speed travel or during travel with the reverse position "R" (during backward movement). At this time, the ratio K is set to a second value. The second value may be 2 to 6, for example, and in the present embodiment, about 3.

The control device 15 calculates a second current value A2 to be supplied to the reaction force actuator 13 based on a deviation Δβ (=βt−β) between the target steering angle βt and the steering angle β such that the steering angle β detected by the steering angle sensor 21 approaches the target steering angle βt. Namely, the control device 15 performs feedback control of the reaction force actuator 13 based on the deviation Δβ.

Figure 3:
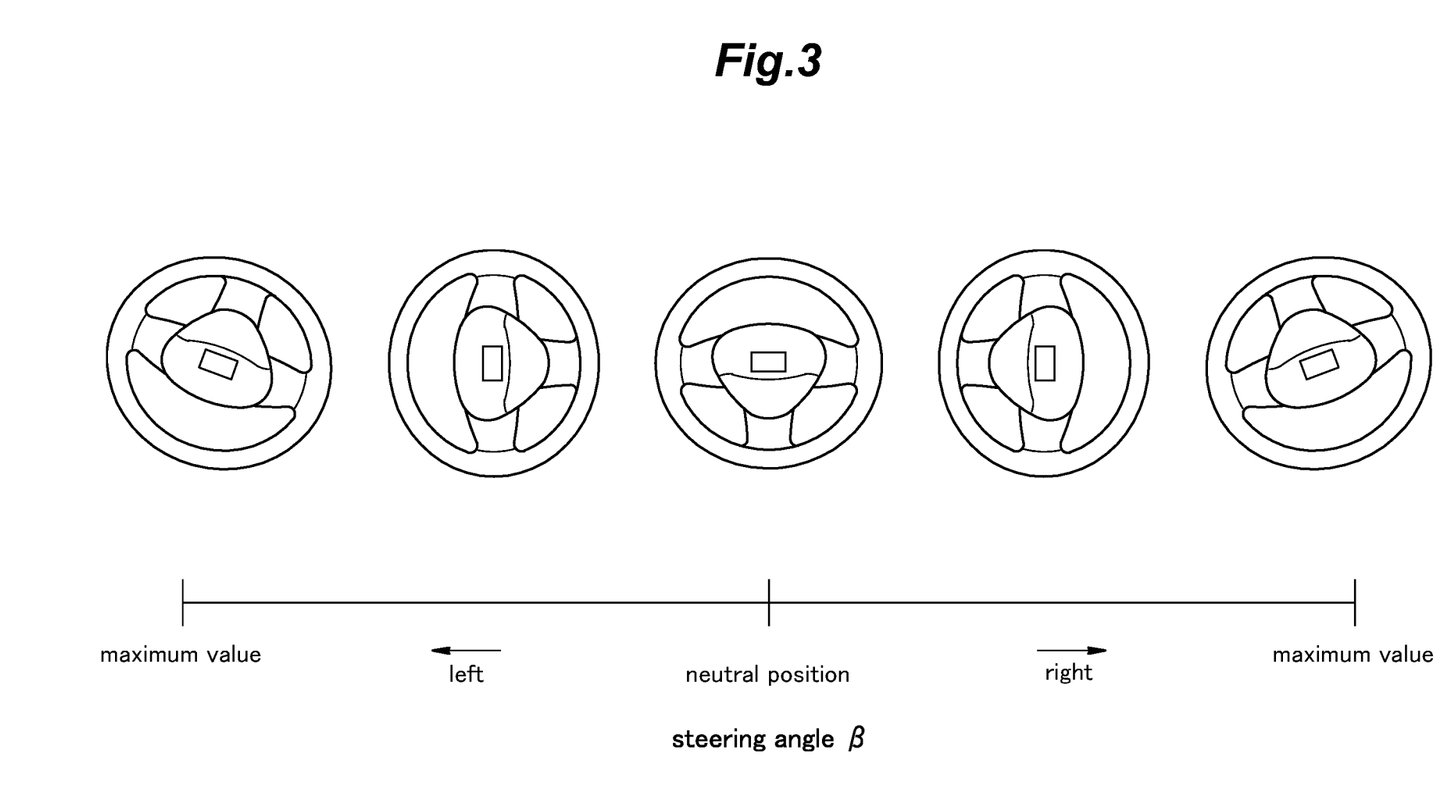
FIG. 3 is an explanatory diagram of a rotation angle range of the steering wheel in an automatic driving mode.

As described above, the control device 15 sets the ratio K to the first value (9 in the present embodiment) during travel in the manual driving mode and sets the ratio K to the second value (3 in the present embodiment 3), which is smaller than the first value, during travel in the automatic driving mode. More specifically, the second value is set such that the steering angle β that corresponds to the maximum value of the steered angle α of the front wheels 3 (the maximum steered angle) determined by the steering mechanism 11 becomes less than 180 degrees. As a result, the rotation angle range of the steering wheel 6 in the automatic driving mode becomes as shown in FIG. 3, and thus, when the driver grips the steering wheel 6, the steering angle recognized by the driver β is prevented from differing from the actual steering angle β. Also, since the maximum value of the steering angle β is less than 180 degrees and the maximum rotation angle range of the steering wheel 6 is less than 360 degrees, the driver can grip appropriate parts of the steering wheel 6 when the driver grips the steering wheel 6.

Figure 2:
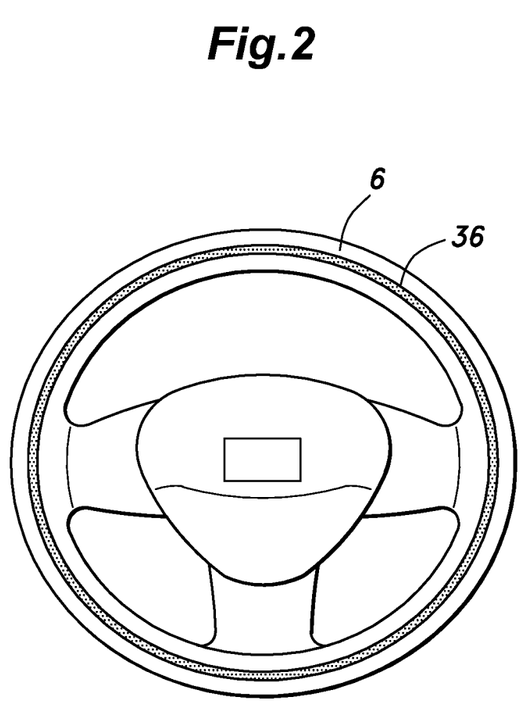
FIG. 2 is a front view of a steering wheel.

FIG. 2 is a front view of the steering wheel 6. As shown in FIG. 2, the steering wheel 6 is substantially circular in shape and is configured such that the driver can recognize the neutral position (namely, the rotational position where the steering angle β=0 degrees) from the direction of a spoke or an emblem.

The steering wheel 6 is provided with an indicator 36. The indicator 36 is constituted of a light emitting member (for example, multiple LEDs) that is disposed at a position that can be viewed by the driver. In the present embodiment, the indicator 36 is formed in an annular shape over the entire circumference of the steering wheel 6. In another embodiment, multiple LEDs may be arranged annularly at intervals.

The control device 15 is configured to control the light emitting operation of the indicator 36. Specifically, the control device 15 switches the light emitting operation of the indicator 36 according to the driving mode selected by the automatic driving control device 4. For example, the control device 15 may make the indicator 36 emit red light when the manual driving mode is selected by the automatic driving control device 4 and emit blue light when the automatic driving mode is selected by the automatic driving control device 4. Also, the control device 15 may make the indicator 36 emit orange light over a predetermined period after the driving mode is switched in order to indicate that the mode is being switched. Here, the period in which the mode is being switched means a period from when the automatic driving control device 4 switched the driving mode to when the control device 15 completes switching of the ratio K.

Figure 4:
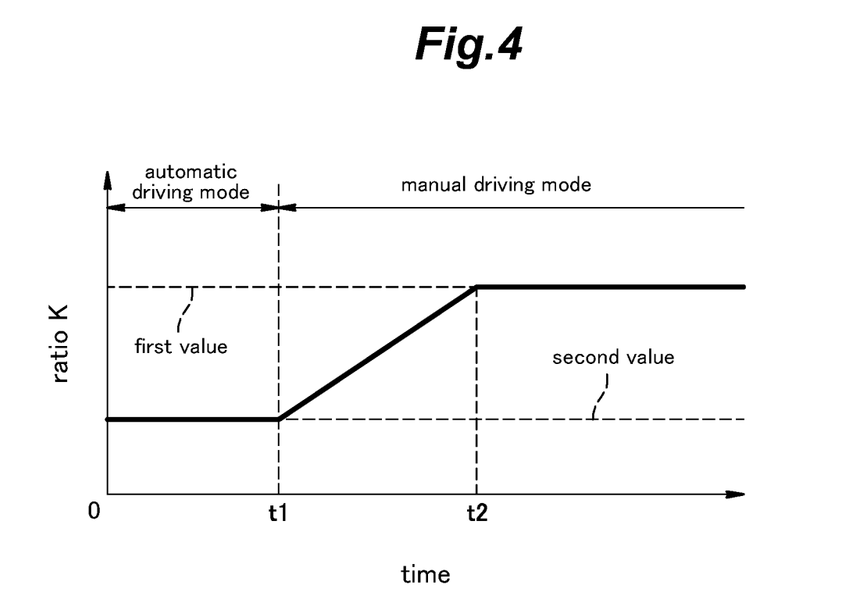
FIG. 4 is a time chart showing an exemplary change of a ratio when the driving mode is switched from the automatic driving mode to the manual driving mode.

FIG. 4 is a time chart showing an exemplary change of the ratio K when the driving mode is switched from the automatic driving mode to the manual driving mode. This example shows a case where the steered angle $\alpha$ of the front wheels 3 is not 0 (the vehicle 1 is turning) when the driving mode is switched to the manual driving mode and the driver does not operate the steering wheel 6 after the driving mode is switched.

As shown in FIG. 4, the control device 15 sets the ratio K to the second value during the automatic driving, and it is necessary to change the ratio K to the first value in accordance with ending of the automatic driving at time point t1. At this time, to avoid a rapid change of the ratio K, the control device 15 gradually increases the ratio K from the second value to the first value over a predetermined time period (from time point t1 to time point t2). Thereby, the target steered angle $\alpha t$ decreases gradually. The control device 15 changes the steered angle $\alpha$ of the front wheels 3 by driving the steering actuator 12 based on the target steered angle $\alpha t$. Note that similar control may be performed also in a case where the steered angle $\alpha$ of the front wheels 3 is 0 (the vehicle 1 is traveling straight) at time point t1 where the driving mode is switched to the manual driving mode.

As described above, the control device 15 can change the ratio K from the second value to the first value by gradually increasing the ratio K as a result of changing the steered angle $\alpha$ when the steering angle $\beta$ is not changing. Also, when the driving mode is switched to the manual driving mode, it is likely that the driver is gripping the steering wheel 6, but since the control device 15 changes the steered angle $\alpha$, the ratio K can be changed even though the driver is gripping the steering wheel 6.

Figure 5:
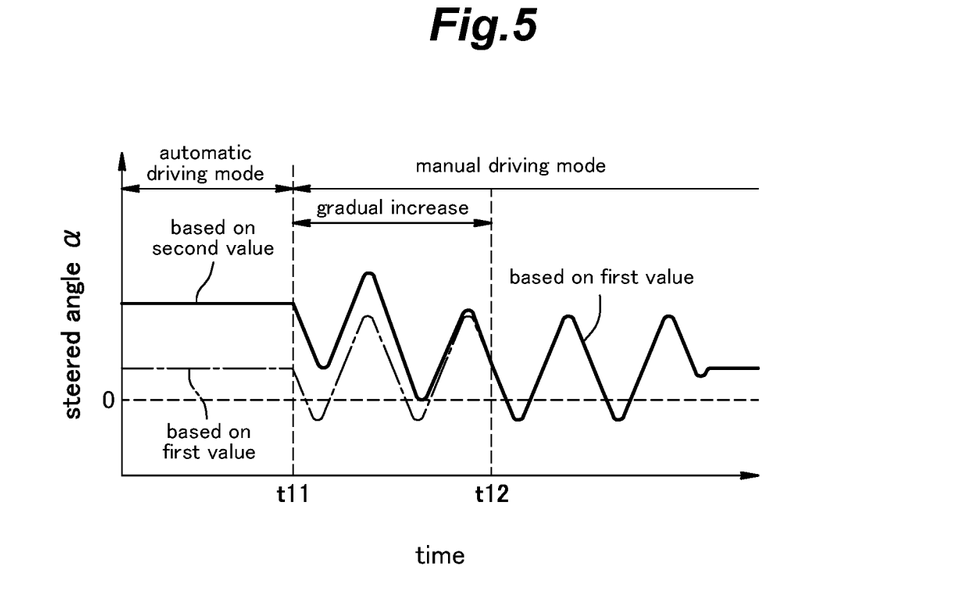
FIG. 5 is a time chart showing an exemplary change of the steered angle due to change of the ratio when the driving mode is switched from the automatic driving mode to the manual driving mode.

FIG. 5 is a time chart showing an exemplary change of the steered angle $\alpha$ due to change of the ratio K when the driving mode is switched from the automatic driving mode to the manual driving mode. This example shows a case where the steered angle $\alpha$ of the front wheels 3 is not 0 (the vehicle 1 is turning) when the driving mode is switched to the manual driving mode and the driver operates the steering wheel 6 after the driving mode is switched.

As shown in FIG. 5, the control device 15 sets the ratio K to the second value during the automatic driving, and it is necessary to change the ratio K to the first value in accordance with ending of the automatic driving at time point t11. At this time, to avoid a rapid change of the ratio K, the control device 15 gradually increases the ratio K from the second value to the first value when the steering angle $\beta$ is changing due to an operation by the driver. Thereby, the target steered angle $\alpha t$ decreases gradually. The control device 15 changes the steered angle $\alpha$ of the front wheels 3 by driving the steering actuator 12 based on the target steered angle $\alpha t$. In the present embodiment, the ratio K increases gradually along with the change of the steering angle $\beta$ and reaches the first value at time point t12. Note that similar control may be performed also in a case where the steered angle $\alpha$ of the front wheels 3 is 0 (the vehicle 1 is traveling straight) at time point t11 where the driving mode is switched to the manual driving mode. Also, the control shown in FIG. 5 may be performed together with the control shown in FIG. 4 or may be performed solely instead of the control shown in FIG. 4.

As described above, the control device 15 can change the ratio K from the second value to the first value by gradually increasing the ratio K as a result of changing the steered angle $\alpha$ while the steering angle $\beta$ is changing. Also, in the case where the driver is steering the steering wheel 6 after the driving mode is switched to the manual driving mode, the control device 15 gradually increases the ratio K while steering the front wheels 3 in the steering direction, whereby it is possible to change the ratio K from the second value to the first value while making the vehicle 1 turn in the steering direction.

Figure 6:
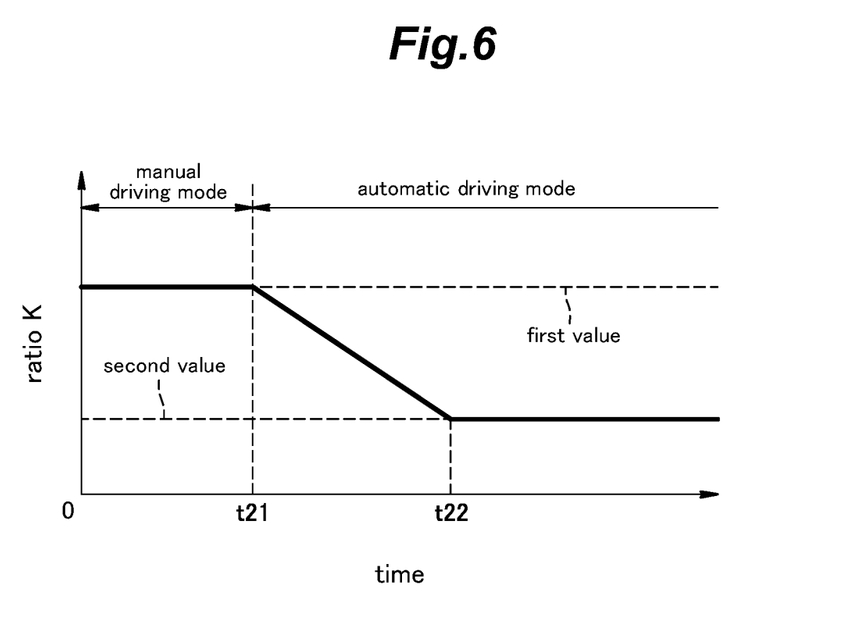
FIG. 6 is a time chart showing an exemplary change of the ratio when the driving mode is switched from the manual driving mode to the automatic driving mode.

FIG. 6 is a time chart showing an exemplary change of the ratio K when the driving mode is switched from the manual driving mode to the automatic driving mode. This example shows a case where the steered angle $\alpha$ of the front wheels 3 is not 0 (the vehicle 1 is turning) when the driving mode is switched to the automatic driving mode.

As shown in FIG. 6, the control device 15 sets the ratio K to the first value during the manual driving, and it is necessary to change the ratio K to the second value in accordance with start of the automatic driving at time point t21. At this time, to avoid a rapid change of the ratio K, the control device 15 gradually decreases the ratio K from the first value to the second value over a predetermined time period (from time point t21 to time point t22). Thereby, the target steering angle $\beta t$ decreases gradually. The control device 15 changes the steering angle $\beta$ of the steering wheel 6 by driving the reaction force actuator 13 based on the target steering angle $\beta t$. Note that similar control may be performed also in a case where the steered angle $\alpha$ of the front wheels 3 is 0 (the vehicle 1 is traveling straight) when the driving mode is switched to the manual driving mode.

As described above, the control device 15 can change the ratio K from the first value to the second value changes by gradually decreasing the ratio K as a result of changing the steering angle $\beta$. Also, when the driving mode is switched to the automatic driving mode, it is likely that the driver is not gripping the steering wheel 6, and therefore, it is possible to change the ratio K by changing the steering angle $\beta$ without changing the travel trajectory.

Also, because the control device 15 gradually decreases the ratio K from the first value to the second value over a predetermined time period, rapid rotation of the steering wheel 6 can be prevented. This prevents the steering wheel 6 from hitting a hand of the driver or the like after the driving mode is switched to the automatic driving mode.

Note that when the driving mode is switched from the manual driving mode to the automatic driving mode, the automatic driving control device 4 starts the automatic steering control from the steered angle $\alpha$ immediately before the switching (namely, the steered angle $\alpha$ at the end of the manual driving). Thereby, even when the ratio K is changed, the steered angle α of the front wheels 3 does not change abruptly nor the travel trajectory changes abruptly.

Incidentally, when the automatic driving control device 4 detects an override operation by the driver while performing the automatic travel control of the vehicle 1 in the automatic driving mode, the automatic driving control device 4 switches the driving mode from the automatic driving mode to the manual driving mode. For example, when the driver operates the steering wheel 6 during the automatic driving, a deviation occurs between the target steering angle βt corresponding to the target steered angle αt set by the automatic driving control device 4 and the actual steering angle β detected by the steering angle sensor 21. In a case where the amount of deviation (namely, an amount of change of the steering angle β from the target steering angle βt) is greater than a predetermined value, the automatic driving control device 4 determines that there is an override operation by the driver and accordingly switches the driving mode to the manual driving mode.

Note that the override detection method is not limited to this. For example, the automatic driving control device 4 may determine whether there is an override operation based on the detected value of the torque sensor 22 (the steering torque Ts). Alternatively, the automatic driving control device 4 may determine whether there is an override operation based on the detected value of the gripping sensor 7 (gripping state of the steering wheel 6). Further, the automatic driving control device 4 may determine whether there is an override operation by combining determinations based on the outputs from multiple sensors such as the steering angle sensor 21, the torque sensor 22, the gripping sensor 7, and the like.

When the driving mode is switched from the automatic driving mode to the manual driving mode, if the control device 15 changes the steered angle α so as to correspond to the absolute value of the steering angle β, the steering direction of the front wheels 3 may become opposite to the driver's steering direction. Therefore, the following control is performed in the vehicle 1 of the present embodiment.

Figure 7:
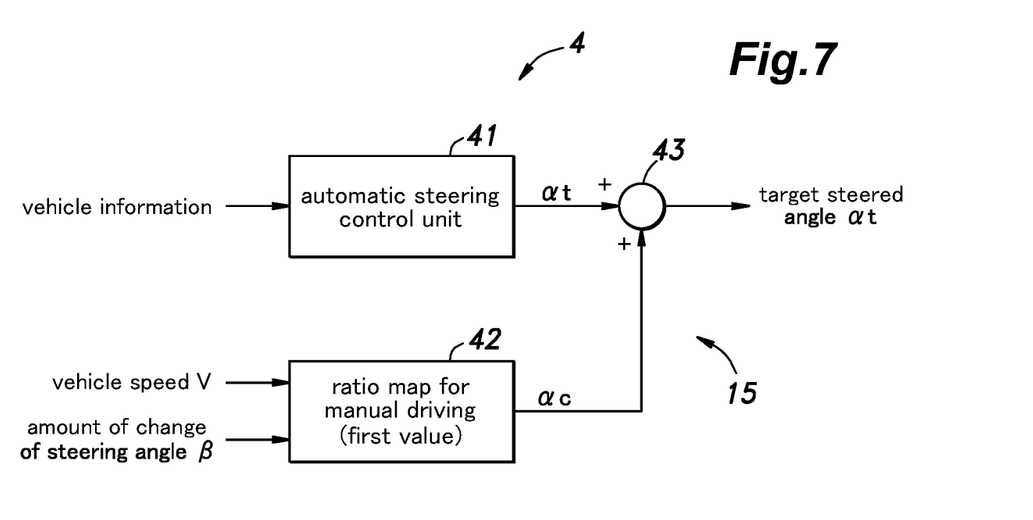
FIG. 7 is a functional block diagram of a main part of the vehicle.

FIG. 7 is a functional block diagram of a main part of the vehicle 1. As shown in FIG. 7, the automatic driving control device 4 functions as an automatic steering control device that executes automatic steering control and is equipped with an automatic steering control unit 41. The automatic steering control unit 41 calculates the target steered angle αt, which is an instruction value of the steered angle α for automatic driving, based on the vehicle speed V, information acquired by the external environment cameras, map information, and so on. The control device 15 is equipped with a ratio map 42 for manual driving (namely, for the first value). The control device 15 extracts the first value from the ratio map 42 according to the vehicle speed V and divides the amount of change of the steering angle β from the target steering angle βt by the first value thereby to calculate a steered angle correction value αc due to override. The control device 15 includes an adder 43 where the steered angle correction value αc is added to the target steered angle αt calculated by the automatic steering control unit 41 to correct the target steered angle αt, and the corrected target steered angle αt is used as a steered angle control amount.

As described above, when the driving mode is switched from the automatic driving mode to the manual driving mode, the control device 15 obtains the steered angle correction value αc for override by dividing the amount of change of the steering angle β from the target steering angle βt corresponding to the target steered angle αt, which is the instruction value of the steered angle α immediately before the switching of the driving mode, by the first value, and adding the steered angle correction value αc to the target steered angle αt to obtain the steered angle control amount. Thereby, the steering direction of the front wheels 3 matches the driver's steering direction.

As described above, the vehicle 1 of the present embodiment is provided with the indicator 36 as a display for indicating the selected driving mode. Thereby, the driver can easily understand whether the vehicle 1 is in the automatic driving or in the manual driving, whereby the driver can recognize the difference of the ratio K.

A concrete embodiment of the present invention has been described in the foregoing, but the present invention is not limited to the above embodiment and may be modified or altered in various ways. For example, in the above embodiment, the steering mechanism 11 which can change the ratio K between the steering angle β and the steered angle α was a steer-by-wire type. However, in another embodiment, it is possible to mechanically couple the steering wheel 6 with the steering mechanism 11 and to provide a variable gear ratio mechanism therebetween to constitute a variable gear ratio steering (VGS). It is also possible to configure the steering mechanism 11 as an active front steering (AFS). Besides, the concrete structure, arrangement, number, angle, etc. of each member or part as well as the concrete procedure may be appropriately changed within the scope of the present invention. Also, not all of the components shown in the above embodiment are necessarily indispensable and they may be selectively adopted as appropriate.

The invention claimed is:

1. A steering device for an automatic driving vehicle which can switch a driving mode between a manual driving mode and an automatic driving mode, the steering device comprising:
    a steering wheel which is configured to be rotatable over an angle range exceeding 180 degrees in each of leftward and rightward directions from a neutral position;
    a steering mechanism that steers a wheel according to a steering angle of the steering wheel, with a ratio of the steering angle to a steered angle being changeable; and
    a control device that controls the ratio of the steering mechanism,
    wherein the control device sets the ratio to a first value during travel in the manual driving mode and sets the ratio to a second value smaller than the first value during travel in the automatic driving mode, wherein the second value is set such that the steering angle corresponding to a maximum steered angle of the wheel specified by the steering mechanism is less than 180 degrees.

2. The steering device according to claim 1, wherein in a case where the steered angle is not 0 when the driving mode is switched from the automatic driving mode to the manual driving mode, the control device changes the steered angle to gradually increase the ratio from the second value to the first value while the steering angle is not changing.

3. The steering device according to claim 1, wherein in a case where the steered angle is not 0 when the driving mode is switched from the automatic driving mode to the manual driving mode, the control device changes the steered angle to gradually increase the ratio from the second value to the first value while the steering angle is changing.

4. The steering device according to claim 1, wherein in a case where the steered angle is not 0 when the driving mode is switched from the manual driving mode to the automatic driving mode, the control device changes the steering angle to gradually decrease the ratio from the first value to the second value.

5. An automatic driving vehicle provided with the steering device according to claim 4, the automatic driving vehicle further comprising an automatic steering control device that executes automatic steering control to control steering by setting an instruction value of at least the steered angle in the automatic driving mode,
   wherein when the driving mode is switched from the manual driving mode to the automatic driving mode, the automatic steering control device starts the automatic steering control from the steered angle immediately before switching of the driving mode.

6. The automatic driving vehicle according to claim 5, wherein when the driving mode is switched from the automatic driving mode to the manual driving mode, the control device obtains an amount of change of the steering angle from a target steering angle which corresponds to the instruction value of the steered angle immediately before switching of the driving mode, obtains a steered angle correction value by dividing the amount of change of the steering angle by the first value, and obtains a steered angle control amount by adding the steered angle correction value to the instruction value.

7. The automatic driving vehicle according to claim 5, further comprising a display that indicates the driving mode that is selected.

\* \* \* \* \*